April 15, 1969    J. A. MANNING    3,438,233
INDEXING MECHANISM
Filed Aug. 9, 1967    Sheet 1 of 3
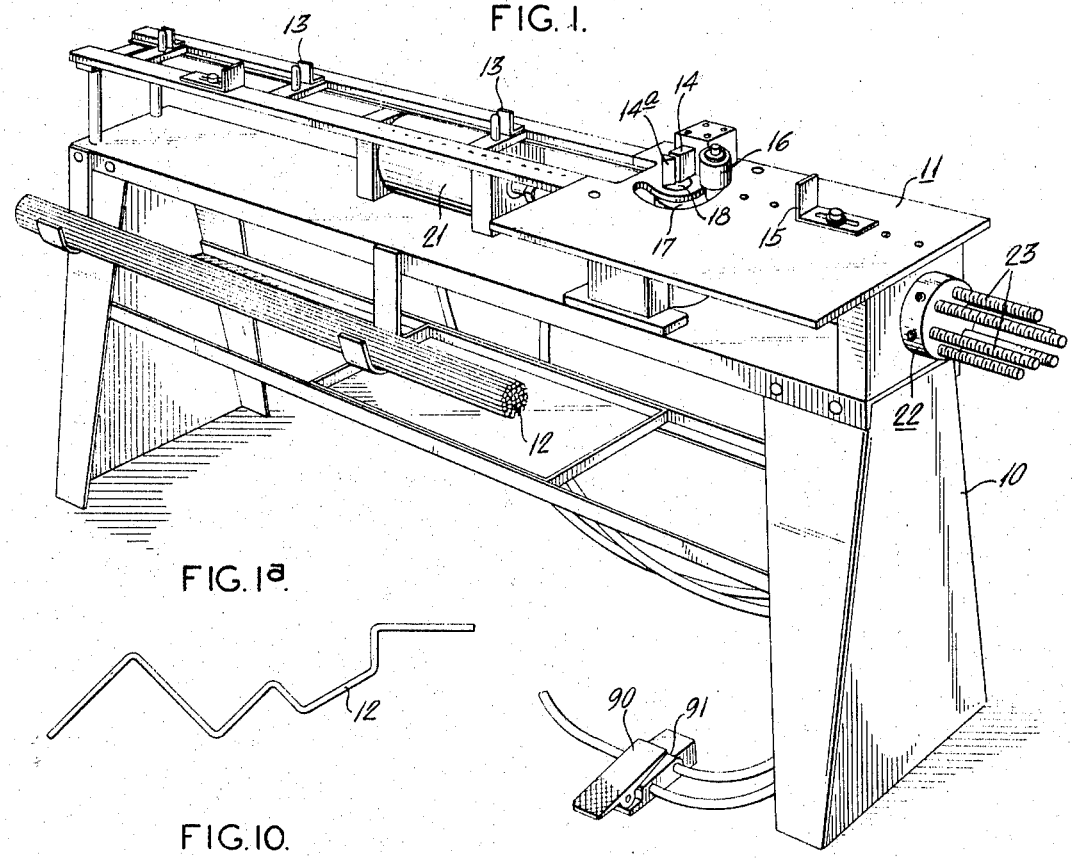
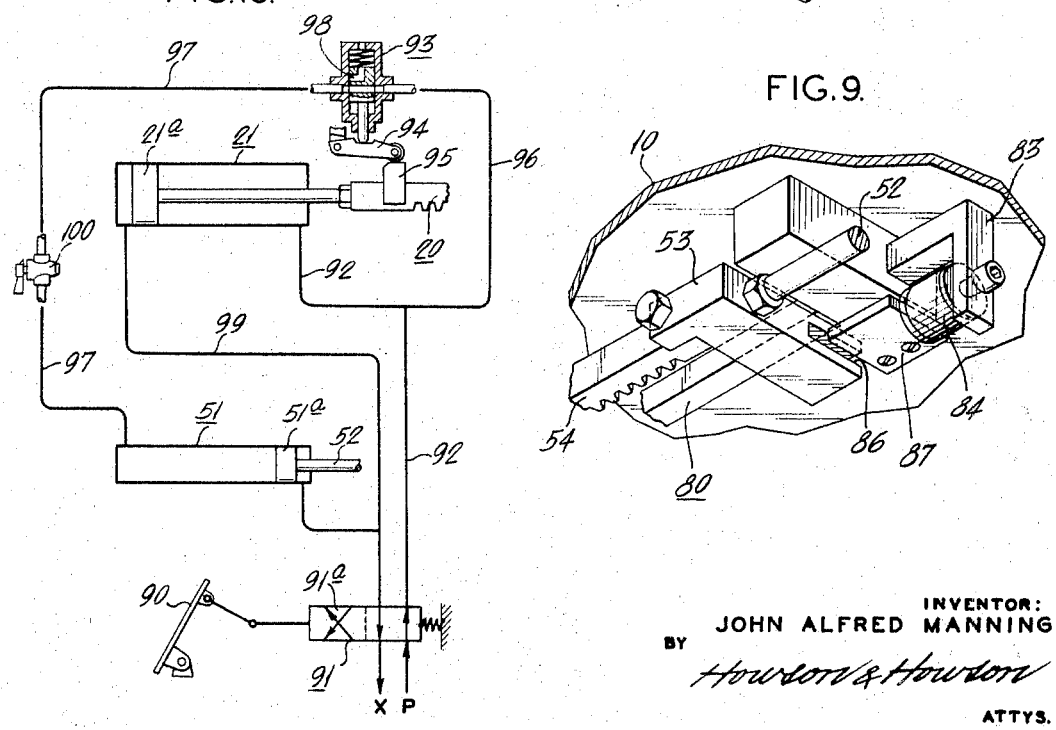
INVENTOR:
JOHN ALFRED MANNING
BY Howson & Howson
ATTYS.

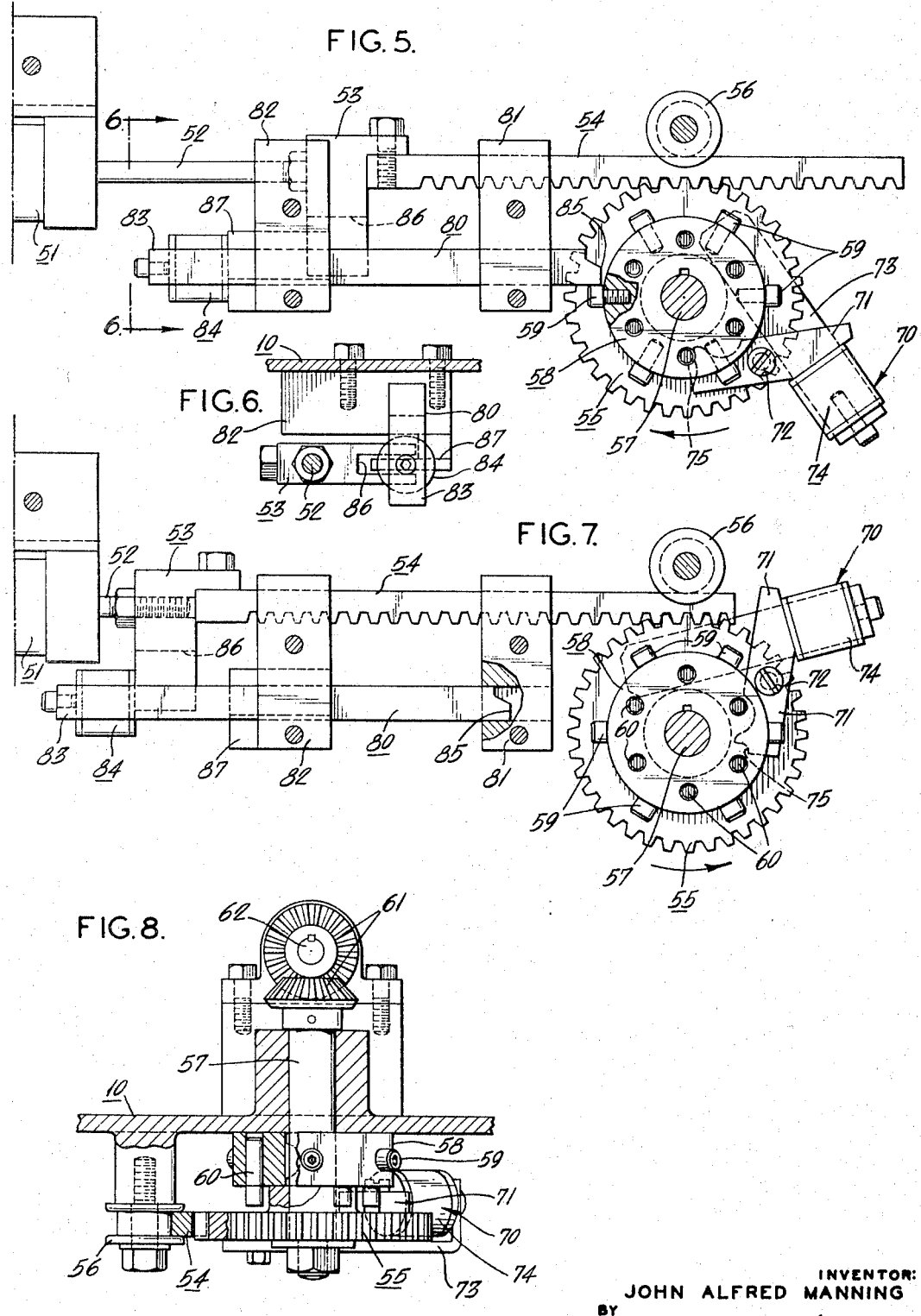

United States Patent Office 3,438,233
Patented Apr. 15, 1969

3,438,233
INDEXING MECHANISM
John Alfred Manning, Philadelphia, Pa., assignor to Penn Machinery Company, Philadelphia, Pa., a proprietorship of Pennsylvania
Filed Aug. 9, 1967, Ser. No. 659,428
Int. Cl. B21d 7/024; B21j 7/46
U.S. Cl. 72—219                                    10 Claims

ABSTRACT OF THE DISCLOSURE

Apparatus for indexing sequentially operative mechanism on machine tools, such as a wire or rod bending machine having a turret head which is presettable and adjustable to a plurality of positions to vary the degree of bend in the wire. The indexing apparatus includes a cooperating rack and gear, the rack being connected to an air piston. A drum, disposed in spaced relation to the gear has radial and depending stud sets, the depending stud sets being operable through a pawl to connect the gear to the drum for unidirectional rotation thereof, while a stop, loosely carried by the rack is operable to engage the radial studs thereby limiting rotation of the drum relative to the gear by overriding the forward movement of the rack. The drum is connected to the sequentially operative mechanism or turret head on the wire bending machine causing it to index the required amount.

Summary of the invention

The present invention relates to simplified indexing mechanism for indexing sequentially operative mechanism in a tooling operation. More particularly the indexing apparatus is especially useful for sequentially positioning rotatable turret heads in, for example, a wire bending machine.

By way of summary, the novel indexing apparatus of the present invention includes drive means which cooperate with rack and gear means, one of the latter means being connected to the drive means. Drum means are positioned in spaced relation to the rack and gear means, the drum means having stop means thereon, and rotatable with the gear means when a clutch means interconnects the two. Cooperating with the drive means is stop engagement means which is engageable with the stop means on the drum so as to limit rotation thereof. Intermediate the sequentially operable mechanism on the machine tool and the drum is connecting means which interconnects the drum and the mechanism to cause indexing thereof.

In view of the above it is a principal object of the present invention to provide novel indexing apparatus for sequentially operative mechanism on machine tools.

Another object of the present invention is to provide novel indexing apparatus which may be utilized on machine tools capable of accomplishing at least two distinct operations on a work piece.

Still another object of the present invention is to provide novel indexing apparatus provided with manually settable stops which are easily removable thus enabling quick changeover to different tool operations.

Still another object of the present invention is to provide novel indexing stop engaging mechanism which permits a releasable securing of the stop.

Still another object of the present invention is to provide novel indexing apparatus especially adapted for operating sequentially operative mechanism on a wire or rod bending machine.

Other objects and a fuller understanding of the invention may be had by referring to the following specification and claims taken in conjunction with the accompanying drawings in which:

FIG. 1 is a perspective view of a wire bending machine as an example of the type of mechanism to which the present invention may be applied;

FIG. 1a is a schematic side elevation view of a rod or wire work piece formed on the apparatus shown in FIG. 1;

FIG. 5 is an enlarged sectional view taken along line 5—5 of FIG. 3;

FIG. 6 is a sectional view taken along line 6—6 of FIG. 5;

FIG. 7 is a fragmentary sectional view of the apparatus shown in FIG. 5, but showing portions of the apparatus in a different position;

FIG. 8 is an enlarged fragmentary sectional view taken along line 8—8 of FIG. 3;

FIG. 9 is a fragmentary perspective view of a portion of the apparatus illustrated in FIGS. 3–7; and FIG. 10 is a schematic diagram of the pneumatic circuit opreative in conjunction with the apparatus of the present invention.

Figure 4:
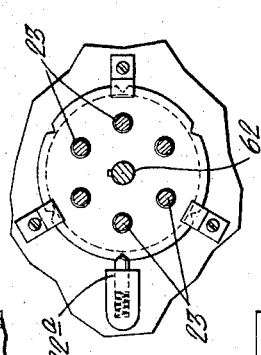
FIG. 4 is a sectional view taken along line 4—4 of FIG. 3.
Figure 2:
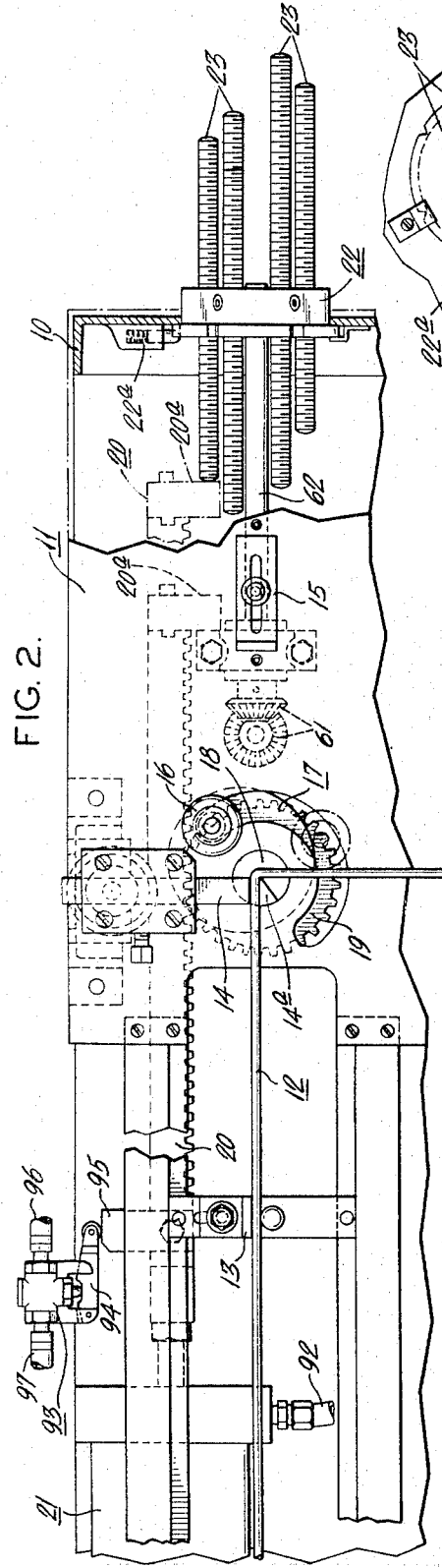
FIG. 2 is a fragmentary plan view of the apparatus illustrated in FIG. 1 and to which the apparatus of the present invention has been added.
Figure 3:
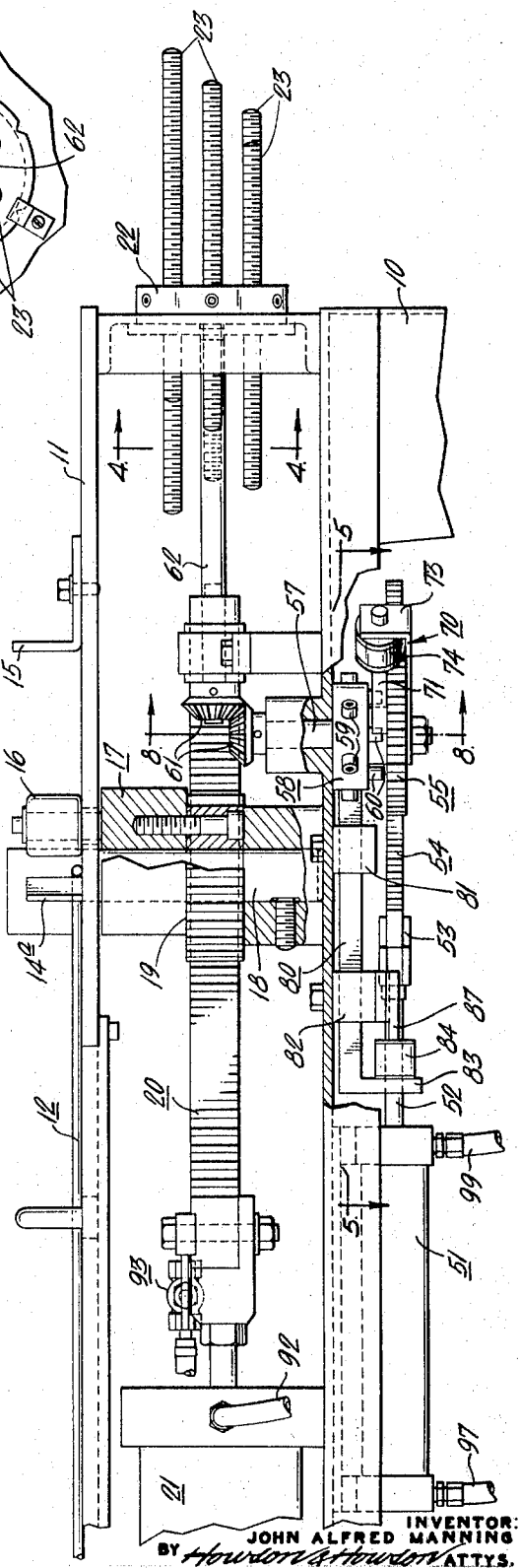
FIG. 3 is a fragmentary side elevational view of the apparatus shown in FIG. 2.

Referring now to the drawings and particularly to FIG. 1 thereof, a typical machine, in the present instance a wire bending machine, to which the apparatus of the present invention may be applied, is shown therein. As illustrated, the wire bending machine comprises a main frame 10 supporting a table portion 11 upon which work pieces such as wire or rod stock 12 is positioned to be bent or configured to a predetermined shape. In order to shape a piece of wire or rod stock 12, the wire is laid in position in wire holders 13, intermediate a back stop 14 and a fixed die or anvil 14a, and butting against a back stop or the like 15 secured to the table portion 11 of the machine. Referring now to FIGS. 1–3, a forming roller 16 is pivotably mounted on a rotatable head 17 which in turn is mounted on a stationary pivot 18, adapted for limited rotation about its axis to impart the prescribed degree of bend to the wire stock about the fixed die or anvil 14a. A spur gear 19, secured to the head 17, meshes with a rack 20 which reciprocates due to the action of an air cylinder or the like 21.

In order to permit variations in the degree of bends so that the wire or rod stock may take a predetermined shape, such as the shape of the wire 12 shown in FIG. 1a, variable rack stop means are provided to limit the angular rotation of the forming roller 16 on the head 17. To this end, a rotatable turret head 22 having a plurality of axially adjustable stop pins or rods 23 therein extending axially of the table portion, project inwardly of the table portion 11, each of the stop pins 23 being alignable, upon rotation of the turret head, with a projection 20a on the terminal end of the rack 20. In this manner the axial travel or forward motion of the rack 20 is controlled and thus the degree of bend of the stock is preset by the axial position of the stop pins 23. Heretofore after each bend was made, the turret was rotated manually overriding detent mechanism 22a and moved through its several settings until work was completed on the work piece. If the work piece required only four bends then the turret head 22 would skip certain stop positions in which the angle of bend was not required.

In accordance with the invention, indexing mechanism is provided which permits, automatically, rotation of the turret head upon completion of each bending operation in the wire or rod stock 12. To this end, and as best shown in FIGS. 3, and 5–9, the indexing means comprises a drive means, in the illustrated instance reciprocation means including an air cylinder 51 connected through its piston rod 52 to a cross head 53 mounting rack means 54 thereon. The rack means 54 is maintained in cooperation with gear means, in the present instance a spur gear 55, by a roller 56, the spur gear 55 being rotatably mounted with respect to an upstanding shaft 57. Positioned in spaced relation to the rack and gear means is drum means, in the present instance a cylinder 58 which is keyed to the shaft 57 and which includes a plurality of stop means thereon, in the present instance comprising a set of radially projecting, studs or pins 59, equal in number to the number of turret stops 23 in the turret 22. As best shown in FIG. 8, a second set of depending pins or studs 60 is engageable by clutch means 70, which clutch means permits engagement between the drum or cylinder 58 upon forward motion of the rack means 54. Connecting means, including a pair of miter gears 61 connected through a shaft 62 to the turret head 22 insure rotation of the turret head 22 upon rotation of the drum 58.

As illustrated best in FIGS. 5, 7 and 8, the clutch means 70 includes a pawl 71 pivotably mounted, as by a pin 72, to the upper surface of the gear 55. Mounted on a bracket 73 connected to the lower surface of the gear 55, is biasing means, in the present instance a magnet 74 which maintains the ratchet or engaging portion 75 of the pawl 71 in normal engagement with the depending pins or studs 60. Thus, as the gear is caused to rotate clockwise by the forward movement of the rack 54 the magnet 74 pulls the pawl 71 so that the ratchet portion 75 thereof engages the studs causing rotation of the drum or cylinder 58. As the rack 54 is retracted by the piston rod 52, the pawl 71 is pulled over the pins in a counterclockwise direction and no ratcheting action occurs.

In order to limit the rotation of the cylinder or drum 58 so that the stop pins 23 will be rotated the correct amount for proper alignment with the projection 20a on the rack 20, stop engagement means are provided carried by the reciprocation or drive means and engageable with the stop means on the drum. To this end, and as best shown in FIGS. 5–7 and 9, the stop engagement means comprises a stop bar 80 slidably mounted in forward and rear bearing blocks 81 and 82 respectively connected to the frame 10 of the machine. As best seen in FIG. 9, the bar 80 has a rearward depending leg portion 83 to which is secured releasable catch means, in the present instance a magnet 84. The opposite end 85 of the bar 80 serves to engage the stop means or studs 59 on the drum 58. As noted in FIG. 9, the cross head 53 connected to the piston rod 52 is longitudinally bifurcated as at 86, while the lower portion of the bearing block 82 carries a bracket or extension 87 registerable with the passageway formed by the bifurcation 86. In this manner, when the rack 54 is in the position shown in FIG. 7, the magnet is attracted to the cross head 53 which permits forward movement of the bar as the cross head moves forward or to the right. Upon the cross head 53 passing beneath the bearing block 82, the bracket 87 peels the magnet from the cross head and the bar 80 is in position to engage one of the studs 59 (see FIG. 5). In a like manner, retraction of the rack 54 causes retraction of the cross head 53 and permits the cross head to retrieve the magnet from the bracket or extension 87 beneath the bearing block 82.

In order to prevent smash-ups or the like from occurring it is desirable that the operation of the indexing mechanism be synchronized with the operation of the sequentially operative mechanism on the machine tool, i.e. in the present instance the turret 22. Of course some overlap of motion may be permitted in certain machine tools but in the illustrated instance with a wire or rod bending machine, it is preferable that the rack 20 of the machine be at least withdrawn from a position adjacent the terminal ends of the stop pins 23 before the indexing mechanism is actuated. To this end, and referring first to FIG. 10, the air cylinder 21 and 51 are shown with their associated racks 20 and 54 in a retracted and forward position respectively, which position is the rest position of the apparatus. The supply and exhaust air are represented by the letters P and X respectively. As noted in FIGS. 1 and 10, an operator's control, in the present instance a foot pedal 90, is connected to a conventional two position cross over air valve 91 for initiating operation of both the sequentially operative mechanism on the machine tools and the indexing apparatus. Upon actuation of the foot pedal the pressure and exhaust lines are reversed from the position shown in FIG. 10 and assume an alignment position as shown by the arrows at 91a of the valve 91. Thus air pressure from the air supply P flows into the head end of the piston 21a associated with the air cylinder 21 causing forward movement of the rack 20. Exhaust from the rod end of the piston 21a occurs through the line 92. Upon forward movement of the rack 20 synchronizing means, in the illustrated instance a normally closed spring loaded actuator valve 93, shown being held in the open position in FIG. 10 by means of a cam 94 riding on a projection 95 on the rack 20, becomes closed. The closing of the actuator valve prevents the line 96 from exhausting air through the valve while opening line 97, through a passage 98 in the valve, to the atmosphere.

Simultaneously with the air pressure being exerted upon the head end of the piston 21a, air pressure is communicated to the rod end of the piston 51a within the air cylinder 51 causing the piston rod 52, connected to the rack 54 to be retracted. As may be seen from FIG. 10 retraction of the piston allows the exhaust from the cylinder 51 to pass to the atmosphere via line 97 and passageway 98 in the actuator valve 93. As heretofore set forth, retraction of the rack 54 permits the pawl 71 associated with the clutch means 70 to ratchet around the pins 60 of the drum or cylinder 58 and no movement of the drum occurs until the rack 54 moves forward. Upon release of the foot pedal (upon completion of the bending operation) the valve 91 assumes the position shown in FIG. 10, and pressure is now exerted upon the rod end of the piston 21a associated with the cylinder 21, exhaust occurring through the exhaust line 99. As the actuator valve 93 is still closed, pressure cannot be communicated through the line 96 to the line 97 to the head end of the piston 51a associated with the cylinder 51, and thus the piston rod 52 and rack 54 are maintained in the left hand or retracted position until the projection 95 engages the cam 94 causing the actuator valve 93 to open. Upon the actuator valve 93 opening, air pressure via lines 92, 96, and 97 is communicated to the head end of the piston 51a and the rack 54 then moves forward. It should be recognized that as the action of the mechanism is fairly rapid, the actuator valve may be positioned close to the fully retracted position of the rack 20 to insure that a smash-up does not occur upon rotation of the turret head 22.

In the event that it is desired to skip one or more stop positions of the stop pins 23, certain of the associated lugs 59, corresponding to the stop to be skipped may be withdrawn from the drum or cylinder 58, the forward throw or movement of the rack 54 being sufficient to rotate the drum approximately 180° unless stopped by the stop engagement means or bar 80. Additionally, if it is desired to carry out a single bending operation on a plurality of pieces, it is a simple matter to close off the valve 100 in the line 97, thus making the indexing apparatus inoperative.

Thus while the indexing apparatus set forth herein is shown to be particularly applicable to a wire or rod bending machine, it should be recognized that the indexing apparatus may be utilized with other machine tools having sequentially operative mechanism for conducting various tooling operations on a work piece.

Thus although the invention has been described with a certain degree of particularity, it should be understood that the present disclosure is only exemplary of the invention, and that numerous changes in the details of construction, and the combination and arrangement of parts may be made without departing from the spirit and scope of the invention as hereinafter claimed.

What is claimed is:

1. Indexing apparatus for sequentially operative mechanism on machine tools, said indexing apparatus comprising: reciprocation means; cooperating rack and gear means, one of which means is connected to said reciprocation means; drum means positioned in spaced relation to said rack and gear means, said drum means having at least one stop means thereon; clutch means for interconnecting one of said gear and rack means to said drum means for rotation thereof, and stop engagement means carried by said reciprocation means and engageable with said stop means on said drum to limit rotation of said drum; and connecting means adapted for interconnecting said drum and said mechanism on said machine tool.

2. Apparatus in accordance with claim 1 including means for synchronizing said reciprocation means and said sequentially operative mechanism on said machine tool.

3. Apparatus in accordance with claim 1 wherein said rack means is connected to said reciprocation means, and said gear means is rotatably mounted on a shaft common to said drum means.

4. Apparatus in accordance with claim 1 wherein said stop means includes at least one projection on said drum, and wherein said stop engagement means carried by said reciprocation means includes a bar; a cross head on said reciprocation means loosely coupled to said bar, and releasable catch means connecting said cross head to said bar whereby, upon said bar contacting said drum adjacent said engagement means, said catch means is released.

5. Apparatus in accordance with claim 4 wherein said catch means comprises a magnet mounted on said bar, and stripping means intermediate said drum and said magnet operable to strip said magnet from said cross head upon the forward stroke of said reciprocating means.

6. Apparatus in accordance with claim 1 wherein said drum means includes a plurality of projections spaced circumferentially thereof, said drum means and said gear means being mounted on a common shaft, said clutch means comprising a latch pivotably mounted on said gear and having means thereon for engagement with said projections, and biasing means operable to keep said latch in engagement with said pins upon forward motion of said rack.

7. Apparatus in accordance with claim 6 wherein said biasing means comprises a magnet.

8. A wire or rod bending machine comprising in combination: a longitudinally extending frame, having a table portion thereon; means to maintain a rod in a predetermined position on said table portion, and rod bending means including at least one die and one movable member; means to cause movement of said movable member relative to said die member, and sequentially operable stop means operative in conjunction with said means to cause movement of said movable member to vary the degree of bend in a rod positioned on said table; apparatus for indexing said sequentially operable stop means, said apparatus comprising reciprocation means connected to one of a cooperating rack and gear means; drum means positioned in spaced relation to said rack and gear means, said drum means having at least one stop means thereon; clutch means for interconnecting one of said gear and rack means to said drum means for rotation thereof, and stop engagement means carried by said reciprocation means and engageable with said stop means on said drum to limit rotation of said drum; and connecting means interconnecting said drum and said sequentially operable stop means.

9. A wire or rod bending machine in accordance with claim 8 wherein said means to cause movement of said movable member relative to said die member includes a rack and gear and means to reciprocate said rack; and synchronizing means interconnecting said reciprocation means and said means to reciprocate said first-mentioned rack.

10. A wire or rod bending machine in accordance with claim 8 wherein said stop means includes at least one projection on said drum, and wherein said stop engagement means carried by said reciprocation means includes a bar; a cross head on said reciprocation means loosely coupled to said bar, and releasable catch means connecting said cross head to said bar whereby, upon said bar contacting said drum adjacent said engagement means, said catch means is released.

References Cited

UNITED STATES PATENTS

| 2,743,757 | 5/1956 | Terwilliger | 72—218 |
|---|---|---|---|
| 2,797,724 | 7/1957 | Walldow | 72—441 |
| 2,855,019 | 10/1958 | Engbert | 72—219 |
| 3,126,045 | 3/1964 | Streit | 72—441 |

RONALD D. GREFE, *Primary Examiner.*

U.S. Cl. X.R.

72—441